US012668515B2

(12) United States Patent
Israelsohn et al.

(10) Patent No.: US 12,668,515 B2
(45) Date of Patent: Jun. 30, 2026

(54) SYSTEM AND METHOD FOR ELECTROCHEMICAL DISINFECTION

(71) Applicant: MICROHEAT TECHNOLOGIES PTY LTD, Mulgrave (AU)

(72) Inventors: Cedric Israelsohn, Mulgrave (AU); Brett William Hernadi, Mulgrave (AU); Ian William Taig, Mulgrave (AU)

(73) Assignee: MICROHEAT TECHNOLOGIES PTY LTD, Mulgrave (AU)

( * ) Notice: Subject to any disclaimer, the term of this patent is extended or adjusted under 35 U.S.C. 154(b) by 649 days.

(21) Appl. No.: 17/924,730

(22) PCT Filed: Apr. 23, 2021

(86) PCT No.: PCT/AU2021/050370
§ 371 (c)(1),
(2) Date: Nov. 11, 2022

(87) PCT Pub. No.: WO2021/226654
PCT Pub. Date: Nov. 18, 2021

(65) Prior Publication Data
US 2023/0183106 A1     Jun. 15, 2023

(30) Foreign Application Priority Data

May 12, 2020     (AU) ................................ 2020901524

(51) Int. Cl.
*C02F 1/467*          (2023.01)
*C02F 1/00*           (2023.01)
*C02F 1/461*          (2023.01)
(52) U.S. Cl.
CPC ............ *C02F 1/4672* (2013.01); *C02F 1/008* (2013.01); *C02F 1/46109* (2013.01);
(Continued)

(58) Field of Classification Search
None
See application file for complete search history.

(56) References Cited

U.S. PATENT DOCUMENTS 6,315,886 B1 *  11/2001  Zappi .................. C02F 1/46109
                                                        204/266
2007/0108056 A1 *  5/2007  Nyberg .................. B01D 61/54
                                                        204/554

(Continued)

FOREIGN PATENT DOCUMENTS

CN          101952654 A      1/2011
WO          2016081467 A1    5/2016
WO          2020264116 A1    12/2020

*Primary Examiner* — Richard C Gurtowski
(74) *Attorney, Agent, or Firm* — Dickinson Wright PLLC; Andrew D. Dorisio

(57) ABSTRACT

A method for electrochemical disinfection of an aqueous solution, the method comprising the steps of: providing one or more disinfecting cells for retaining an aqueous solution, each disinfecting cell including one or more electrode pairs positioned therein; arranging the one or more disinfecting cells along a flow path, the flow path including an inlet to and an outlet from the one or more disinfecting cells; determining at the one or more disinfecting cells the electrical conductivity, or specific conductance of the aqueous solution; determining from the electrical conductivity, or specific conductance of the aqueous solution a voltage to apply across the one or more electrode pairs at a current sufficient to produce disinfection species therein; and passing the current from the one or more electrode pairs to the aqueous solution to produce a modified aqueous solution.

21 Claims, 2 Drawing Sheets

(52) U.S. Cl.
CPC .............. *C02F 2001/46138* (2013.01); *C02F 2001/46147* (2013.01); *C02F 2201/46135* (2013.01); *C02F 2201/4614* (2013.01); *C02F 2201/46145* (2013.01); *C02F 2209/05* (2013.01); *C02F 2303/04* (2013.01); *C02F 2305/023* (2013.01)

(56) References Cited

U.S. PATENT DOCUMENTS

| | | | |
|---|---|---|---|
| 2011/0155577 A1 | 6/2011 | Capettini | |
| 2013/0129327 A1 | 5/2013 | Israelsohn et al. | |
| 2013/0240458 A1 | 9/2013 | Conradt | |
| 2014/0027728 A1 | 1/2014 | Yoon et al. | |
| 2015/0122741 A1* | 5/2015 | Eckelberry | C02F 1/463 |
| | | | 210/96.1 |
| 2017/0152162 A1 | 6/2017 | Cam et al. | |
| 2020/0002195 A1 | 1/2020 | Ricci et al. | |

* cited by examiner

SYSTEM AND METHOD FOR ELECTROCHEMICAL DISINFECTION

TECHNICAL FIELD

The present invention generally relates to disinfection of aqueous solutions, and more specifically, to electrochemical systems and methods for disinfection of aqueous solutions.

BACKGROUND OF INVENTION

The provision of clean drinking water is essential to life. The quality of drinking water varies from location-to-location, and often it is necessary to remove microorganisms, such as bacteria including *Legionella pneumophila* and other organisms, organics, pathogens and combinations of such contaminants before it can be safely consumed.

Wastewater can also be a valuable resource in locations where water supplies are limited. However, it is also necessary to remove contaminants before it can be safely reused for irrigation, recreational purposes, or discharged into the environment.

Water disinfection methods, such as thermal disinfection, use of chlorine, chlorine dioxide, monochloramine, metal ions, UV and other such methods have been proposed. However, the effective elimination of *Legionella* and other harmful bacteria from water distribution systems is difficult to achieve with conventional disinfection approaches. Insufficient disinfection efficacy, followed by occasional outbreaks of *Legionella* caused diseases, and identification of chlorine as a source of potentially harmful disinfecting by-products have led to a need to develop alternative disinfecting techniques, including electrochemical techniques.

In physical or electromechanical disinfection processes the microorganisms are removed or killed by means of irradiation with ultraviolet or ionising radiation, heating to elevated temperatures, ultrasound, or separation through membrane filtration. The main drawback of the physical disinfection methods is the fact that these processes are only effective in the immediate surroundings of their operating devices.

It would be desirable to provide a method and system which ameliorates or at least alleviates one or more of the above problems or to provide an alternative.

It would also be desirable to provide a method and system that ameliorates or overcomes one or more disadvantages or inconvenience of known water disinfection methods and systems.

A reference herein to a patent document or other matter which is given as prior art is not to be taken as an admission or a suggestion that the document or matter was known or that the information it contains was part of the common general knowledge as at the priority date of any of the claims.

SUMMARY OF INVENTION

According to an aspect of the present invention, there is provided a method for electrochemical disinfection of an aqueous solution, the method comprising the steps of: providing one or more disinfecting cells for retaining an aqueous solution, each disinfecting cell including one or more electrode pairs positioned therein; arranging the one or more disinfecting cells along a flow path, the flow path including an inlet to and an outlet from the one or more disinfecting cells; determining at the one or more disinfecting cells the electrical conductivity, or specific conductance of the aqueous solution; determining from the electrical conductivity, or specific conductance of the aqueous solution a voltage to apply across the one or more electrode pairs at a current sufficient to produce disinfection species therein; and passing the current from the one or more electrode pairs to the aqueous solution to produce a modified aqueous solution. The modified solution may have a higher concentration of disinfection species therein. The one or more disinfecting cells may not only retain, but also facilitate the flow-through of the aqueous solution.

Advantageously, the method is suitable for electrochemical disinfection of contaminated aqueous solutions by passing current from the one or more electrode pairs to the aqueous solution to modify the contaminants therein by way of exposure to the disinfection species (e.g., reactive oxygen species, hydrogen peroxide, ozone, oxygen, hydroxyl radicals, chlorine and mixtures thereof). The type of disinfection species may be dependent on the aqueous solution. The voltage applied to the electrodes may be alternating current (AC) or direct current (DC). In either case, the electrical power source may be supplied by a single phase or three phase power supply.

In one or more embodiments, the steps of determining the electrical conductivity, or specific conductance of the aqueous solution and determining the voltage to apply across the one or more electrode pairs are performed continuously along the flow path.

In one or more embodiments, the method further comprises the step of determining from the electrical conductivity, or specific conductance of the aqueous solution at the inlet, an initial voltage to apply across the one or more electrode pairs. The inlet may be connected to a flow path where the disinfecting cells are positioned.

In one or more embodiments, initial voltage is determined such that the current drawn by the aqueous solution upon application of the voltage across the one or more electrode pairs does not exceed a peak current rating of the electrical supply or the peak current rating of the supply power control devices supplying voltage to the electrode pairs. The peak current rating may be the most current that the electrical supply can handle without tripping or suffering damage or irreversible damage. Advantageously, this may also provide protection to the electrical supply and power control devices supplying voltage to the electrode pairs.

In one or more embodiments, determining the electrical conductivity, or specific conductance of the aqueous solution includes detecting an increase or decrease in the current drawn by the aqueous solution upon application of the voltage across the one or more electrode pairs. Advantageously the conductivity or specific conductance gradient is thereby managed.

In one or more embodiments, the one or more electrode pairs are segmented into two or more segments, each segment being configured to individually apply voltage to the aqueous solution. Individually applying the voltages across the two or more segments increases or decreases the effective surface area of the one or more electrode pairs. Advantageously the conductivity or specific conductance gradient is thereby managed. By activating individual segments of the segmented electrodes may be performed in a manner to effect very accurate delivery of desired current and voltage by the segmented electrodes. Each segmented electrode may be divided into segments of varying size, to permit combinations of segments to be selected to provide an increased accuracy of selection of desired effective area. For example, where the segmented electrode is divided into three segments, the segments may have relative effective areas in a ratio of 1:2:4, that is, the segments preferably constitute four sevenths, two sevenths and one seventh of the total effective electrode area, respectively. In such embodiments appropriate activation of the three electrode segments permits selection of any one of seven available effective areas. Alternative segment area ratios and numbers of segments may be provided. For example, the one or more electrode pairs are segmented into n segments each having effective surface areas in a ratio of $1:2: \ldots :2(n-1)$.

In one or more embodiments, the two or more segments are of uniform size.

In one or more embodiments, the two or more segments are of different sizes.

In one or more embodiments, the one or more electrode pairs are substantially parallel and positioned in a generally horizontal plane relative to the flow path.

In one or more embodiments, the one or more electrode pairs are substantially vertical and positioned in a generally vertical plane relative to the flow path.

In one or more embodiments, wherein the one or more electrode pairs are at least in part coated with a material selected from the group consisting of boron-doped diamond (BDD), mixed metal oxide (MMO), antimony-doped tin oxide, and combinations thereof. Such materials may be useful in anodic electrochemical reactions. The materials may include a layered structure and included various binding materials.

In one or more embodiments, the one or more electrode pairs are formed at least in part from a material selected from the group consisting of metal, conductive polymer, carbon, carbon impregnated polymer.

In one or more embodiments, wherein one or more electrode pairs are manufactured from an electrically conductive, inert material such as graphite, carbon, and combinations thereof. Such material may be useful in anodic electrochemical reactions. The material may include a layered structure and included various binding materials.

In one or more embodiments, the method further comprises the step of measuring a flow rate of the aqueous solution flowing through the flow path. The method may further comprise the step of increasing or decreasing the flow rate of the aqueous solution flowing through the flow path to regulate a residency time of the aqueous solution in the one or more disinfecting cells. The residency time for which a given volume of the aqueous solution will receive electrical power from the electrodes may be determined by measuring the flow rate of the aqueous solution through the passage. The flow rate may be also limited by one or more threshold values associated with the flow rate and/or the pumping or regulation of the aqueous solution.

In one or more embodiments, the method may further comprise the step of measuring a temperature of the aqueous solution flowing through the flow path. The temperature of the aqueous solution is also directly proportional to the current being drawn by the aqueous solution. Electric current can be effectively used to determine the increase or decrease in aqueous solution temperature. Higher temperatures can be beneficial in lowering disinfecting cell power while maintaining or increasing rates of disinfection. While higher temperatures can be achieved, if needed, by preheating the incoming aqueous solution, heating of the solution is not necessary for the generation of disinfection species.

In one or more embodiments, the method may further comprise the step of determining the temperature of the aqueous solution within the disinfecting cell by the measurement of current drawn by the disinfecting cell; and providing the temperature as feedback to a temperature controller configured adjust the applied voltage to effectively heat or reduce heating of the aqueous solution.

In one or more embodiments, the method may further comprise the step of measuring the temperature of the aqueous solution at the outlet; and providing the temperature as feedback to a temperature controller configured adjust the applied voltage to effectively heat or reduce heating of the aqueous solution.

In one or more embodiments, the one or more one or more disinfecting cells are serially arranged along the flow path.

In one or more embodiments, the method may further comprise the step of not applying the voltage across the one or more electrode pairs if the electrical conductivity, or specific conductance of the aqueous solution falls outside a predetermined range. Advantageously, this may also provide protection to the electrical supply and power control devices supplying voltage to the electrode pairs.

According to another aspect of the present invention, there is provided a system for electrochemical disinfection of an aqueous solution, the system comprising: one or more disinfecting cells for retaining an aqueous solution, each disinfecting cell including one or more electrode pairs positioned therein; the one or more disinfecting cells arranged along a flow path, the flow path including an inlet to and an outlet from the one or more disinfecting cells; and a controller configured to: regulate the flow of an aqueous solution from the inlet to the one or more disinfecting cells; determine at the one or more disinfecting cells the electrical conductivity, or specific conductance of the aqueous solution; determine from the electrical conductivity, or specific conductance of the aqueous solution a voltage to apply across the one or more electrode pairs at a current sufficient to produce disinfection species therein; and pass the current from the one or more electrode pairs to the aqueous solution to produce a modified aqueous solution.

In one or more embodiments, the controller is further configured to determine the electrical conductivity, or specific conductance of the aqueous solution and determining the voltage to apply across the one or more electrode pairs continuously. The controller may determine the electrical conductivity, or specific conductance via signals sent directly or via a sensor through a digital general-purpose interface or other bus.

In one or more embodiments, the controller is further configured to determine from the electrical conductivity, or specific conductance of the aqueous solution at the inlet an initial voltage to apply across the one or more electrode pairs.

In one or more embodiments, the initial voltage is determined such that the current drawn by the aqueous solution upon application of the voltage across the one or more electrode pairs does not exceed a peak current rating of the electrical supply.

In one or more embodiments, determining the electrical conductivity or specific conductance of the aqueous solution includes detecting an increase or decrease in the current drawn by the aqueous solution upon application of the voltage across the one or more electrode pairs.

In one or more embodiments, the one or more electrode pairs are segmented into two or more segments, each segment being configured to individually apply voltage to the electrode pairs by the controller. Advantageously the conductivity or specific conductance gradient is thereby managed.

In one or more embodiments, individually applying a varying voltage across the two or more segments serves to effectively increase or decrease the effective surface area of the one or more electrode pairs.

In one or more embodiments, the two or more segments are of uniform size.

In one or more embodiments, the two or more segments are of different sizes.

In one or more embodiments, the one or more electrode pairs are segmented into n segments each having effective surface areas in a ratio of $1:2: \ldots :2^{(n-1)}$.

In one or more embodiments, the one or more electrode pairs are substantially parallel and positioned in a generally horizontal plane relative to the flow path.

In one or more embodiments, the one or more electrode pairs are substantially vertical and positioned in a generally vertical plane relative to the flow path.

In one or more embodiments, the one or more electrode pairs are at least in part coated with a material selected from the group consisting of boron-doped diamond (BDD), mixed metal oxide (MMO), antimony-doped tin oxide, and combinations thereof.

In one or more embodiments, the one or more electrode pairs are formed at least in part from a material selected from the group consisting of metal, conductive polymer, carbon and carbon impregnated polymer.

In one or more embodiments, the one or more electrode pairs are manufactured from an electrically conductive, inert material such as graphite, carbon and combinations thereof.

In one or more embodiments, the controller is further configured to measure a flow rate of the aqueous solution flowing through the flow path.

In one or more embodiments, the controller is further configured to increase or decrease the flow rate of the aqueous solution flowing through flow path to regulate a residency time of the aqueous solution in the one or more disinfecting cells.

In one or more embodiments, the controller is further configured to measure a temperature of the aqueous solution flowing through the flow path.

In one or more embodiments, the controller is further configured to measure the temperature of the aqueous solution at the outlet; and provide the temperature as feedback to a temperature controller configured to heat or reduce the heating of the aqueous solution.

In one or more embodiments, the one or more one or more disinfecting cells are serially arranged along the flow path.

In one or more embodiments, the controller is further configured not to apply or to vary the voltage across the one or more electrode pairs if the electrical conductivity, or specific conductance of the aqueous solution falls outside a predetermined range, thereby managing a specific conductance gradient.

According to another aspect of the present invention, there is provided a method for electrochemical disinfection of an aqueous solution, the method comprising the steps of: passing the aqueous solution along a flow path from an inlet to an outlet, the flow path including at least first and second disinfecting cells positioned along the flow path such that the aqueous solution passing the first disinfecting cell subsequently passes the second disinfecting cell, each disinfecting cell including at least one electrode pair between which an electric current is passed through the aqueous solution to produce disinfection species therein during its passage along the flow path, and wherein at least one of the disinfecting cells includes at least one segmented electrode, the segmented electrode comprising a plurality of electrically separable segments allowing an effective surface area of the segmented electrode to be controlled by selectively activating the segments such that upon application of a voltage to the activated electrode segment(s), current drawn will depend in part upon the effective surface area; determining and simultaneously managing the aqueous solution conductivity, or conductivity gradient at the inlet and within subsequent disinfecting cells; determining from measured aqueous solution conductivity, or specific conductance a required voltage and current to be delivered to the aqueous solution by the first disinfecting cell to raise the concentration of disinfection species therein by a first amount; determining a modified aqueous solution conductivity, or specific conductance resulting from operation of the first disinfecting cell; determining from the modified aqueous solution conductivity, or specific conductance a required voltage and current to be delivered to the aqueous solution by the second disinfecting cell to raise the concentration of disinfection species therein by a second amount; and activating segments of the segmented electrode in a manner to effect delivery of desired current and voltage by the segmented electrode.

Advantageously, the method is suitable for electrochemical disinfection of contaminated aqueous solutions by progressively passing current from the one or more electrode pairs to the aqueous solution to modify the contaminants therein by way of exposure to the disinfection species (e.g., reactive oxygen species, hydrogen peroxide, ozone, oxygen, hydroxyl radicals, chlorine and mixtures thereof). The voltage applied to the electrodes may be alternating current (AC) or direct current (DC).

BRIEF DESCRIPTION OF DRAWINGS

The invention will now be described in further detail by reference to the accompanying drawings. It is to be understood that the particularity of the drawings does not supersede the generality of the preceding description of the invention.

DETAILED DESCRIPTION

The invention is suitable for disinfecting aqueous solutions by an advanced oxidation process employing electrochemical disinfection through the creation of disinfection species such as Hydroxyl Radicals (OH).

In an embodiment, the aqueous solution is water, and it will be convenient to describe the invention in relation to that exemplary, but non-limiting, application. The invention is also suitable to be combined with a water heating system, where higher temperatures can be beneficial in lowering disinfecting cell power while maintaining or increasing rates of disinfection. While higher temperatures can be achieved, if needed, by preheating the incoming aqueous solution, heating of the solution is not necessary for the generation of disinfection species.

The term electrochemical disinfection generally relates to the modification of contaminants, including microorganisms, by passing an electric current through the water component of an aqueous solution, by means of coated electrodes.

The term "coated", as used herein with reference to "coated electrodes", may refer to the attachment of a material on the outer surface of another material. The attachment may be partial or whole coverage of the surface of the other material and may be by any mechanical, chemical, or other force or bond.

The term "manufactured" may refer to production of one or more electrode pairs that can be manufactured from an electrically conductive, inert material such as graphite, carbon and combinations thereof.

Figure 1:
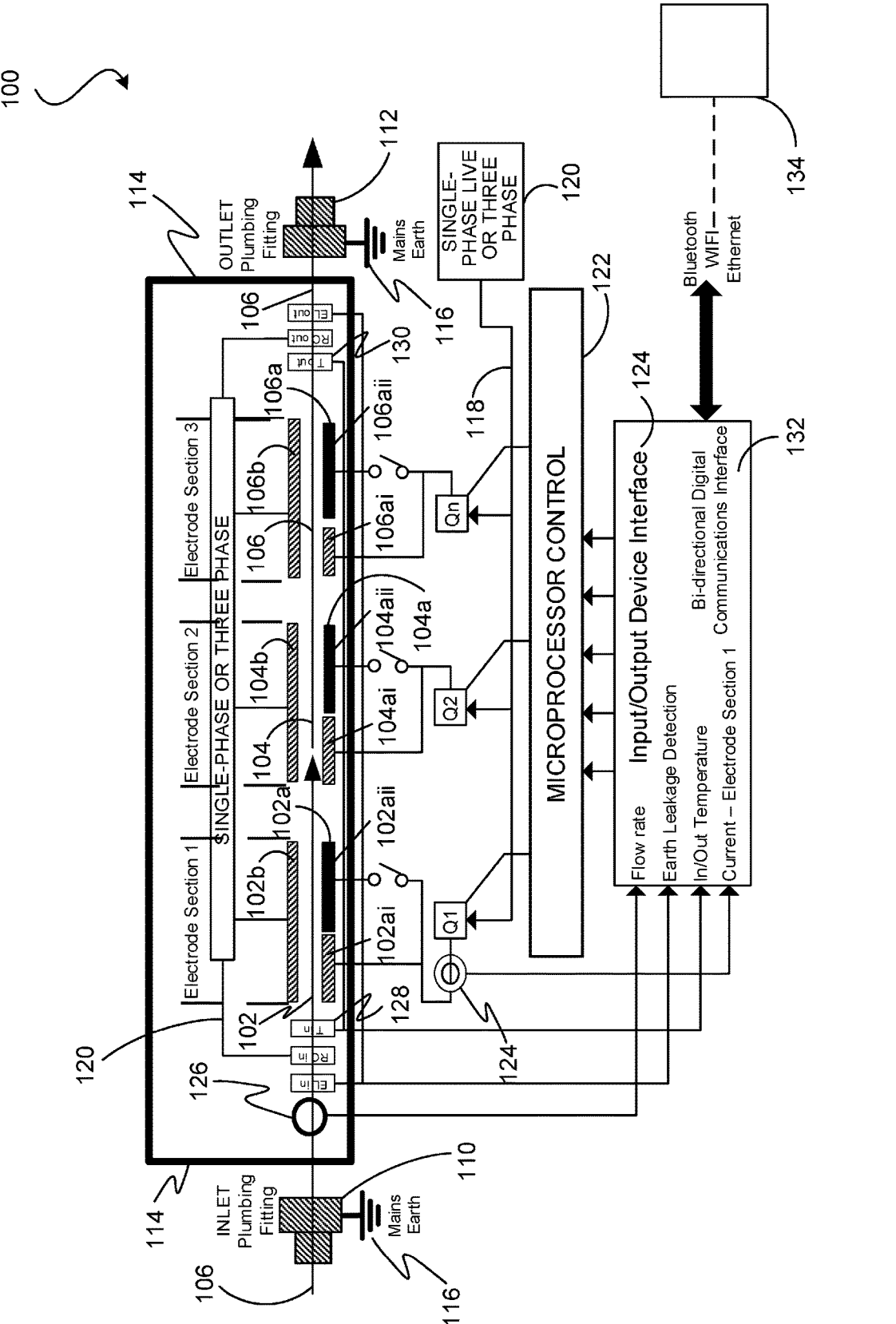
FIG. 1 shows a simplified block diagram of an aqueous solution flow path passing n disinfecting cells in accordance with an embodiment of the present invention.

FIG. 1 shows a simplified block diagram of a system for electrochemical disinfection of an aqueous solution 100 according to an embodiment of the present invention. An aqueous solution is caused to flow through three disinfecting cells 102, 104 and 106 arranged along a flow path 108. The flow path 108 includes an inlet 110 to the disinfecting cells 102, 104 and 106 and an outlet 112 from the disinfecting cells 102, 104 and 106. The disinfecting cells 102, 104 and 106 retain the aqueous solution as it passes through the flow path and those skilled in the art will recognise suitable designs for providing the stated functions, for example, a tube or pipe.

In one or more embodiments, the disinfecting cells 102, 104 and 106 are housed in, or integral with, a body 114. The body 114 is preferably made from a material that is electrically non-conductive, such as synthetic plastic material. However, the body 114 is likely to be connected to metallic water pipes, such as copper pipes, that are electrically conductive. Accordingly, earth connections 116 shown in FIG. 1 are included at the inlet 110 and outlet 112 of the body 114 so as to electrically earth any metal tubing connected to the system 100. The earth connections 116 would ideally be connected to a mains electrical earth of the electrical installation in which the disinfecting system of the embodiment was installed. As the earth connections 116 may draw current, by virtue of electrode voltage, through water passing through the system 100, activation of an earth leakage protection connected to the mains voltage supply 120 in the form of a circuit breaker or residual current device (RCD) may be effected. In a preferred form of this embodiment, the system 100 includes earth leakage circuit protective devices.

When the outlet taps or faucets (not shown) are opened, the aqueous solution flows through the body 114 as indicated by flow path arrows 108.

In the embodiment shown, the flow path 108, is provided with three disinfecting cells 102, 104 and 106 including respective sets of electrode pairs 102a, 104a and 106a. However, it will also be appreciated that additional or fewer disinfecting cells can be used. The electrodes may be boron-doped diamond (BDD), mixed metal oxide (MMO), or antimony-doped tin oxide or combinations of BDD, MMO or antimony-doped tin oxide coated metal or a non-metallic conductive material such as conductive plastics material, carbon, carbon impregnated material or the like.

It is important that the electrode substrate and coatings are selected from a group of electrically conductive materials (or combinations of materials) to minimise chemical reaction and/or electrolysis while promoting the generation of disinfection species.

The electrode pairs may also be manufactured from an electrically conductive, inert material such as graphite, carbon and combinations thereof.

In one or more embodiments, one electrode of each electrode pair 102a, 104a and 106a is segmented into two or more segments, each segment being configured to individually apply voltage. The segmented electrode of each electrode pair 102a, 104a and 106a, is connected to a common switched electrical supply path 118 via separate voltage supply power control devices Q1, Q2, . . . , Qn, while the other of each electrode pair 102b, 104b and 106b are connected to the incoming single phase neutral or three phase voltage supply 120 respectively. The separate voltage supply power control devices Q1, Q2, . . . , Qn switch the common electrical supply in accordance with the power management control provided by the controller 122. The controller 122 may include a microprocessor that interacts with other components of the system 100 to regulate or measure the flow rate of the aqueous solution, detect earth leakages, measure the temperature at the inlet 110 and/or outlet 112 (or at other positions along the flow path 108), and/or measure the current drawn 124 by the aqueous solution at the disinfecting cells 102, 104 and 106 (or at other positions along the flow path 108).

Electrical current supplied to disinfecting cell 102, which may also be supplied to disinfecting cells 104 and 106, is measured by current measuring device(s) 124. Only one current measuring device 124 is shown. However, it will be appreciated that the current at each disinfecting cell 102, 104 and 106 may be measured by individual current measurement devices 124. For example, current measurements made by a hall current sensor electrically connected the output of power control devices Q1, Q2, . . . , Qn are communicated to the power management controller 122.

In one or more embodiments, the current measuring devices 124 are coupled to the power control devices Q1, Q2, . . . , Qn so as to be operable to determine the current being drawn from the single phase or three phase power supply 120 by the aqueous solution. A current amplifier may be used to amplify the output signal of the current measuring devices 124. The amplified signal is then received by the controller 122 and is compared with a threshold level. The calculated current threshold level will typically be set as a range of ampere, so that the current drawn by the aqueous solution remains equal to or as close as equal to the threshold level only when the aqueous solution is flowing through the flow path 108. While the system 100 is in use, the controller 122 will continue to compare the current measuring device(s) 124 output with the threshold level and make appropriate adjustments to the selection of combinations of electrode pairs, as well as making appropriate adjustments to the voltage supplied to the electrode pairs 102a, 104a and 106a so as to maintain a substantially constant current to promote the generation of disinfection species in the aqueous solution, while consistently ensuring that the current handling capability of the electrical supply is not exceeded. However, when the system 100 enters a state of non-use, such as entering a standby mode, the controller 122 will remove the voltage applied to the disinfecting cells 102, 104 and 106 accordingly.

By way of non-limiting example, the current measuring device(s) 124 may be able to sense, slight increases in the detected flow of electrical current through the aqueous solution so as to determine the ideal voltage to apply across the electrode pairs 102a, 104a and 106a for the production of disinfection species therein. That is, the current measurement(s) are supplied as an input signal via input interface 124 to controller 122 which acts as a power supply controller.

In one or more embodiments, the controller 122 may also receive signals via input interface 124 from a flow rate measurement device or flow switch incorporating flow rate limiting 126 located near the inlet 110 to the body 114. The volume of the aqueous solution passing between any set of electrodes 102a, 104a and 106a may be accurately determined by measuring the flow rate. Similarly, the residency time for which a given volume of the aqueous solution will receive electrical power from the electrodes may be determined by measuring the flow rate of the aqueous solution through the passage. It will be appreciated that the flow rate may be limited by one or more threshold values associated with the flow rate and/or the pumping or regulation of the aqueous solution.

Disinfection of the aqueous solution results from the electrified solution being exposed to the coated electrodes (as described above) in the disinfecting cells. The advanced oxidation process is promoted by providing the required current to be drawn by the aqueous solution being disinfected.

Accordingly, the current flowing through the aqueous solution can be used as a measure of the electrical conductivity, or the specific conductance of that aqueous solution and hence allows determination of the required change in applied voltage and electrode combinations selected required to keep the electric current drawn adequate for the generation of disinfection species.

The electrical conductivity, or specific conductance, and hence the specific conductance of the aqueous solution will change with rising temperature, thus causing a specific conductance gradient along the path of aqueous solution flow 108. In one or more embodiments, the controller 122 also receives signals via signal input interface 124 from an input temperature measurement device 128 to measure the temperature of the aqueous solution at the inlet 110. An output temperature measurement device 130 may also be provided for measuring the temperature of the aqueous solution at the outlet 112. Signals from the output temperature measurement device 130 may be provided as feedback to the controller 122 to allow the aqueous solution temperature to be continuously monitored.

The system 100 of the present embodiment is further capable of adapting to variations the aqueous solution conductivity, or specific conductance, whether arising from the particular location at which the system is installed or occurring from time-to-time at a single location or by virtue of changes in the aqueous solution temperature. In this regard the aqueous solution conductivity, or specific conductance is determined as being directly proportional to the electric current drawn by the aqueous solution flowing through the disinfecting cells 102, 104 and 106.

Variations in the aqueous solution conductivity, or specific conductance will cause changes in the amount of electrical current drawn by each electrode for a given applied voltage. This embodiment monitors such variations and ensures that the system 100 draws a desired level of current by using the determined conductivity, or specific conductance value to initially select a commensurate combination of electrode segments before allowing the system to operate. The electrodes represented by 102a, 104a, 106a are segmented into a number of electrode segments, 102ai and 102aii, 104ai, 104aii, 106ai, and 106aii.

For each respective electrode, the ai segment is fabricated to typically form about one third or two thirds of the active area of the electrode, the aii segment is fabricated to typically form about two thirds or one third of the active area of the electrode and so on. Selection of appropriate segments or appropriate combinations of segments thus allows the effective area of the electrode to be any one of three available values for electrode area. Consequently, for highly conductive aqueous solutions a smaller electrode area may be selected so that for a given voltage the current drawn by the electrode is prevented from rising above desired or safe levels, while yet maintaining the required current to be drawn to promote electrochemical disinfection. Conversely, for poorly conductive aqueous solutions, a larger electrode area may be selected so that the required current will be drawn to affect the desired disinfection. Selection of segments can be simply made by activating or deactivating the power switching devices Q1, . . . , Qn as appropriate.

In particular, the combined surface area of the selected electrode segments is specifically calculated to ensure that the rated maximum electrical current values of the electrical supply system are not exceeded.

In one or more embodiments, the controller 122 receives the various monitored inputs and performs necessary calculations with regard to electrode active area selection, desired electrode pair voltages and currents to promote electrochemical disinfection of the aqueous solution flowing through the flow path 108. The controller 122 controls the supply of voltage from either of the single-phase supply 120, or the each of the three separate phases of a three-phase supply 120 connected to each of the electrode sections 102, 104 and 106.

The voltage supply is separately controlled by the separate control signals from the controller 122 to the power switching devices Q1, . . . , Qn. It will therefore be appreciated that, based upon the various parameters for which the controller 122 receives representative input signals, a computing means under the control of a software program or firmware within the controller 122 calculates the control pulses required by the power switching devices in order to supply the required voltage to impart the desired disinfection of the aqueous solution flowing through the flow path 108, as will be discussed with reference to FIG. 2.

In a number of embodiments, the controller 122 also converts readings from the current measuring device(s) 124, temperature sensors 128 and 130, flow rate measurement device or flow switch incorporating flow rate limiting 126, power switching devices Q1, . . . , Qn etc. into digital values and communicates messages based on those digital values to a digital communication device 132. It should also be appreciated that filtering methods can also be used, such as those, but not limited to including, moving average filters, evenly weighted moving average filters, the like, or a combination of these filters, which may be particularly suitable for implementation in firmware. The messages can then be sent to other devices (e.g., computers, smartphones, tablets, laptop computers, desktop computers, server computers, among other forms of computer systems) via a hardwired digital communication service, such as, but not limited to, Ethernet, RS485 or the like, or a wireless connection such as 802.11 Wi-Fi network or Bluetooth™ for processing by an application 134 or cloud computing platform. Advantageously, this can provide remote monitoring and/or configuration of the system 100, making it convenient for operators to modify parameters, such as flow rates or electrical power, based on the properties of the aqueous solution being disinfected. For example, decreasing the flow rate and/or increasing the temperature when solution conductivities are low, as for the purification of drinking water. In addition, system maintenance and management can also be facilitated via the digital communication method adopted.

It will be appreciated that various control implementations are possible. For instance, the system 100 may include, in a number of embodiments, an artificial intelligence-based control mechanism, which may in use, in part, cloud-based services. As noted, the decision whether to increase or decrease the flow rate (i.e., increasing or decreasing the residency time the aqueous solution stays in the disinfecting cells) or voltages (and subsequent current draw) may be based on multiple sensor inputs through interface 124 provided to the controller 122 (or to another platform via wireless transceiver 132). This coordination of communication and calculations may occur automatically, within the controller 122, an application 134 or an application hosted in the cloud. Further, the controller 122 may implement machine-learning based on the input data. Based on this information, the system 100 may pre-emptively make changes to the flow rate, voltages, temperature and the like.

It will be appreciated that the communication can be carried out using any suitable digital communication protocols, including, but not limited to Wi-Fi 802.11, 6LowPan/ZIGBEE™ 802.15, Ethernet 802.3, 802.11 and 802.15.4, and RS485.

The wireless transceiver 132 may also be adapted to facilitate communication between a remote firmware update mechanism and the controller 122. As will be appreciated by those skilled in the art, the remote firmware update mechanism together with the controller 122 may be adapted to periodically check for updates from a remote repository, download firmware updates and to compare downloaded firmware to existing firmware to determine the necessity of installing the downloaded firmware and the like.

Figure 2:
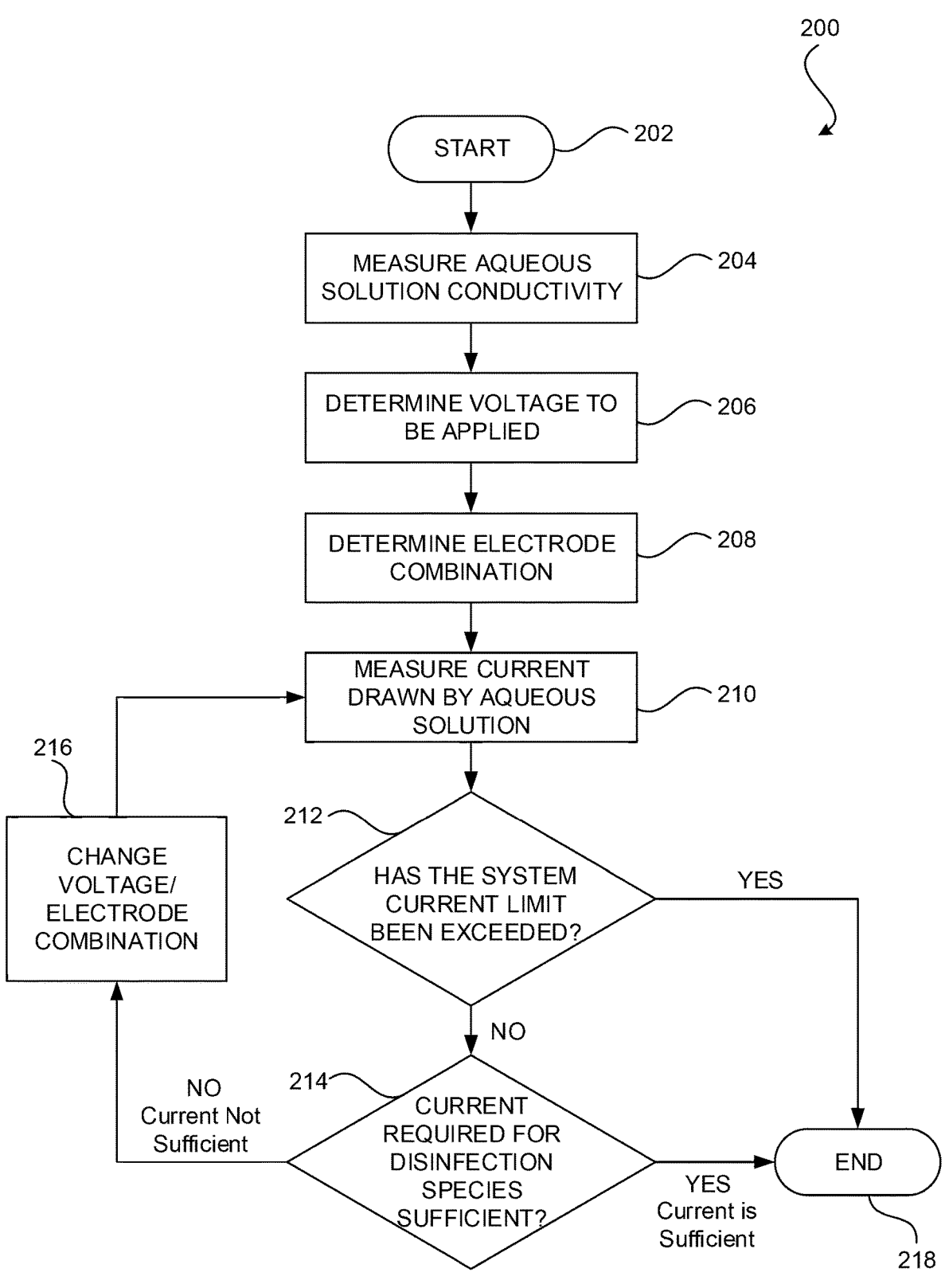
FIG. 2 shows a flowchart of a method for electrochemical disinfection of an aqueous solution passing n disinfecting cells in accordance with an embodiment of the present invention.

FIG. 2 shows a flowchart of a method for electrochemical disinfection of an aqueous solution in accordance with an embodiment of the present invention, including the embodiments discussed with reference to FIG. 1.

The method 200 starts at start block 202, at step 204 the electrical conductivity, or specific conductance of an aqueous solution is determined at the inlet to a first disinfecting cell including a first electrode pair. In one or more embodiments, the electrical conductivity, or specific conductance is determined by the amount of current drawn by the aqueous solution while an initial voltage is applied across the first electrode pair from a voltage supply power control device (i.e., Q1 as discussed with reference to FIG. 1).

At step 206, from the electrical conductivity, or specific conductance of the aqueous solution a voltage to apply across the first electrode pair at a current sufficient to produce disinfection species in the aqueous solution is determined. At step 208, the electrode segment combination is determined. For example, where the segmented electrode is divided into three segments, the segments may have relative effective areas in a ratio of 1:2:4, that is, the segments preferably constitute four sevenths, two sevenths and one seventh of the total effective electrode area, respectively. In one or more embodiments, all of the segments may be activated for aqueous solutions that are of relatively low conductivity, or specific conductance, and one or more of the segments may be activated for aqueous solutions that are of relatively high conductivity, or specific conductance.

Once the applied voltage and electrode segment combination has been determined, the current drawn by the aqueous solution is then measured at step 210.

At step 212 it is determined whether the current limit of the system has been exceeded. If the system current limit has exceeded the limit, the process ends at step 218. If the system current limit has not exceeded the limit, at step 214 it is determined determines whether there is sufficient current to generate the disinfection species required for disinfection.

In one or more embodiments, the method returns over step 216 such that the electrical conductivity, or specific conductance is continuously determined and appropriate adjustments to the voltages supplied and electrode segment combinations in all disinfecting cells 102, 104 and 106 are made so as to maintain a substantially constant current to promote the efficient generation of disinfection species in the aqueous solution. Advantageously, by returning over step 216 the method is capable of adapting to variations in the aqueous solution's conductivity, or specific conductance, whether arising from the particular location at which the system is installed or occurring from time-to-time at a single location, for example a temporary increase or decrease in mineral content or temperature.

In one or more embodiments, steps 210 to 216 may be repeated for n disinfecting cells until the method ends at step 218.

It will be appreciated that some embodiments may be comprised of one or more generic or specialized controllers or processors (or "processing devices") such as microcontrollers, microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The invention claimed is:

1. A method for electrochemical disinfection of an aqueous solution, the method comprising the steps of:
   providing one or more disinfecting cells for retaining an aqueous solution, each disinfecting cell including one or more electrode pairs positioned therein;
   arranging the one or more disinfecting cells along a flow path, the flow path including an inlet to and an outlet from the one or more disinfecting cells;
   determining at the one or more disinfecting cells an electrical conductivity, or specific conductance of the aqueous solution;
   determining, in each of the one or more disinfecting cells, a temperature of the aqueous solution within the disinfecting cell by the measurement of an electric current drawn by the aqueous solution, wherein the temperature of the aqueous solution is directly proportional to the electric current being drawn by the aqueous solution;
   determining the electrical conductivity by detecting an increase or decrease in the electric current drawn by the aqueous solution and determining, from the electrical conductivity, a voltage to apply across the one or more electrode pairs at a current sufficient to produce disinfection species therein; and passing the current from the one or more electrode pairs to the aqueous solution to produce a modified aqueous solution.

2. The method of claim 1, wherein the steps of determining the electrical conductivity, or specific conductance of the aqueous solution and determining the voltage to apply across the one or more electrode pairs are performed continuously along the flow path.

3. The method of claim 2, further comprising the step of determining from the electrical conductivity, or specific conductance of the aqueous solution at the inlet, an initial voltage to apply across the one or more electrode pairs.

4. The method of claim 3, wherein the initial voltage is determined such that the current drawn by the aqueous solution upon application of the voltage across the one or more electrode pairs does not exceed a peak current rating of an electrical supply supplying voltage to one or more electrode pairs.

5. The method of claim 1, wherein determining the electrical conductivity, or specific conductance of the aqueous solution includes detecting an increase or decrease in the current drawn by the aqueous solution due to a change in aqueous solution temperature upon application of the voltage across the one or more electrode pairs.

6. The method of claim 1, wherein the one or more electrode pairs are segmented into two or more segments, each segment being configured to individually apply voltage to the aqueous solution.

7. The method of claim 6, wherein individually applying the voltages across the two or more segments increases or decreases an effective surface area of the one or more electrode pairs.

8. The method of claim 1, wherein the one or more electrode pairs are at least in part coated with a material selected from the group consisting of boron-doped diamond (BDD), mixed metal oxide (MMO), antimony-doped tin oxide, and combinations thereof.

9. The method of claim 1, wherein the one or more electrode pairs are formed at least in part from a material selected from the group consisting of metal, conductive polymer, carbon, carbon impregnated polymer.

10. The method of claim 1, further comprising the step of measuring a flow rate of the aqueous solution flowing through the flow path to calculate the voltage to be applied in order to draw the current sufficient to produce the disinfection species therein, and increasing or decreasing the flow rate of the aqueous solution flowing through the flow path to regulate a residency time of the aqueous solution in the one or more disinfecting cells in order for the voltage applied to allow the aqueous solution to draw the current sufficient to produce the disinfection species therein.

11. A system for electrochemical disinfection of an aqueous solution, the system comprising:

one or more disinfecting cells for retaining an aqueous solution, each disinfecting cell including one or more electrode pairs positioned therein;

the one or more disinfecting cells arranged along a flow path, the flow path including an inlet to and an outlet from the one or more disinfecting cells; and a controller configured to:

regulate a flow of an aqueous solution from the inlet to the one or more disinfecting cells;

determine at the one or more disinfecting cells an electrical conductivity, or specific conductance of the aqueous solution;

determine, in each of the one or more disinfecting cells, a temperature of the aqueous solution within the disinfecting cell by the measurement of an electric current drawn by the aqueous solution, wherein the temperature of the aqueous solution is directly proportional to the electric current being drawn by the aqueous solution;

determine the electrical conductivity by detecting an increase or decrease in the electric current drawn by the aqueous solution and determine, from the electrical conductivity, a voltage to apply across the one or more electrode pairs at a current sufficient to produce disinfection species therein; and pass the current from the one or more electrode pairs to the aqueous solution to produce a modified aqueous solution.

12. The system of claim 11, wherein the controller is further configured to determine an electrical conductivity gradient of the aqueous solution and thereby calculate the voltage to apply across the one or more electrode pairs continuously.

13. The system of claim 11, wherein the controller is further configured to determine from the electrical conductivity, or specific conductance of the aqueous solution at the inlet an initial voltage to apply across the one or more electrode pairs.

14. The system of claim 13, wherein the initial voltage is determined such that the current drawn by the aqueous solution upon application of the voltage across the one or more electrode pairs does not exceed a peak current rating of an electrical supply supplying voltage to one or more electrode pairs.

15. The system of claim 11, wherein determining the electrical conductivity, or specific conductance of the aqueous solution includes detecting an increase or decrease in the current drawn by the aqueous solution upon application of the voltage across the one or more electrode pairs.

16. The system of claim 11, wherein the one or more electrode pairs are segmented into two or more segments, each segment being configured to individually apply voltage by the controller to allow effective management of changes in an aqueous solution conductivity gradient.

17. The system of claim 16, wherein individually applying the voltage across the two or more segments increases or decreases the effective electric current drawn by the aqueous solution by virtue of electrode surface area.

18. The system of claim 11, wherein the one or more electrode pairs are at least in part coated with a material selected from the group consisting of boron-doped diamond (BDD), mixed metal oxide (MMO), antimony-doped tin oxide, and combinations thereof.

19. The system of claim 11, wherein the one or more electrode pairs are formed at least in part from a material selected from the group consisting of metal, conductive polymer, carbon and carbon impregnated polymer.

20. The system of claim 11, wherein the controller is further configured to measure a flow rate of the aqueous solution flowing through the flow path and to increase or decrease the flow rate of the aqueous solution flowing through flow path to regulate a residency time of the aqueous solution in the one or more disinfecting cells.

21. A method for electrochemical disinfection of an aqueous solution, the method comprising the steps of:

passing the aqueous solution along a flow path from an inlet to an outlet, the flow path including at least first and second disinfecting cells positioned along the flow path such that the aqueous solution passing the first disinfecting cell subsequently passes the second disinfecting cell, each disinfecting cell including at least one electrode pair between which an electric current is passed through the aqueous solution to produce disinfection species therein during its passage along the flow path, and wherein at least one of the disinfecting cells includes at least one segmented electrode, the segmented electrode comprising a plurality of electrically separable segments allowing an effective surface area of the segmented electrode to be controlled by selectively activating the segments such that upon application of a voltage to the activated electrode segment(s), current drawn will depend in part upon the effective surface area;

determining the aqueous solution conductivity, or specific conductance at the inlet;

determining from measured aqueous solution conductivity, or specific conductance a required voltage and current to be delivered to the aqueous solution by the first disinfecting cell to raise the concentration of disinfection species therein by a first amount;

determining a modified aqueous solution conductivity, or specific conductance resulting from operation of the first disinfecting cell;

determining from the modified aqueous solution conductivity, or specific conductance a required voltage and current to be delivered to the aqueous solution by the second disinfecting cell to raise the concentration of disinfection species therein by a second amount; and activating segments of the segmented electrode in a manner to effect delivery of desired current and voltage by the segmented electrode.

* * * * *